July 15, 1969   E. DEBUS   3,455,717
STABLE DISPERSIONS OF PYROGENIC FINELY DIVIDED OXIDES SUITABLE
FOR IMPROVING THE SURFACE CHARACTERISTICS OF CELLULOSE
HYDRATE FILMS, AND PROCESS FOR
THEIR PRODUCTION
Filed Sept. 23, 1965   2 Sheets-Sheet 1
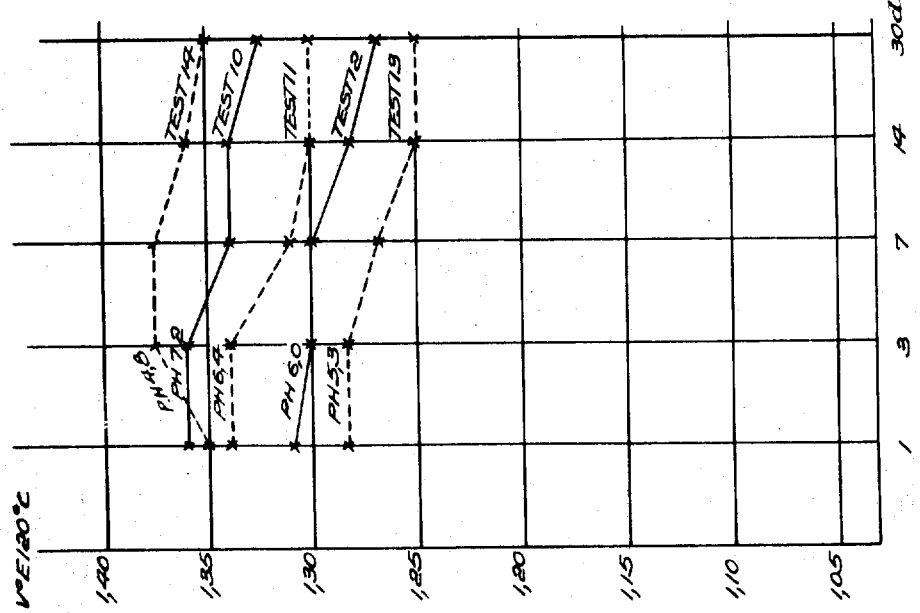
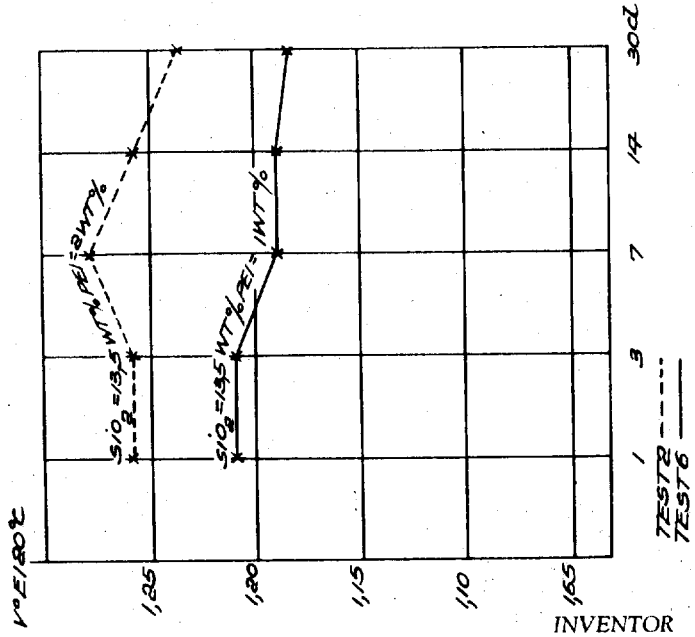
INVENTOR
ERWIN DEBUS,
BY *Bailey, Stephens & Huettig*
ATTORNEYS United States Patent Office 3,455,717
Patented July 15, 1969

3,455,717
STABLE DISPERSIONS OF PYROGENIC FINELY DIVIDED OXIDES SUITABLE FOR IMPROVING THE SURFACE CHARACTERISTICS OF CELLULOSE HYDRATE FILMS, AND PROCESS FOR THEIR PRODUCTION
Erwin Debus, Wiesbaden-Biebrich, Germany, assignor to Deutsche Gold- und Silber-Scheideanstalt vormals Roessler, Frankfurt, Germany
Filed Sept. 23, 1965, Ser. No. 489,567
Claims priority, application Germany, Sept. 25, 1964, D 45,507
Int. Cl. C09c 1/00, 5/00; B01j 13/00
U.S. Cl. 106—287                    7 Claims

ABSTRACT OF THE DISCLOSURE

Stable aqueous dispersion of at least one finely divided pyrogenic silica aerogel adapted for the surface treatment of cellulose hydrate films consisting essentially of an aqueous solution of 1–3% by weight of polyethylene imine at least a portion of which is in the form of an acid addition salt and containing about 7.5 to 30% by weight of said finely divided pyrogenic silica aerosol dispersed therein.

---

Figure 3:
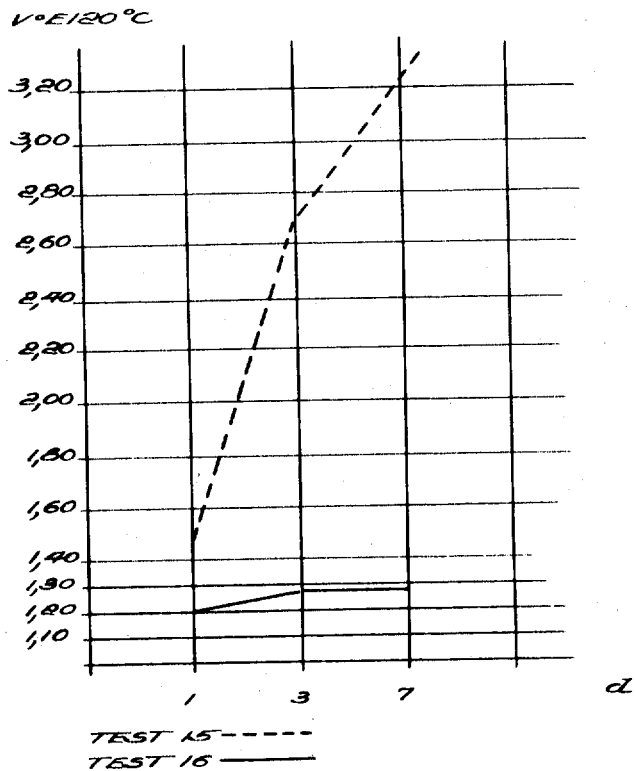

The present invention relates to an improved process for the production of stable dispersions of pyrogenic finely divided oxides such as pyrogenic silica aerogel which are suitable for the treatment of cellulose hydrate films to improve their surface characteristics and in particular to a process which renders it possible to increase the quantity of such finely divided oxides in the dispersions.

Aqueous dispersions of oxide aerogels have been used for the improvement of surface characterictics of fibers, fabrics and films. As is known, the application of the usual aqueous SiO₂ dispersions is limited to such instances where no cationically active substances are used in connection therewith. In all such instances where the use of cationically active substances cannot be avoided for certain reasons, the joint use of aqueous SiO₂ dispersions is not possible. Already the slightest traces of cationically active substances lead to coagulation of such dispersions.

A concrete example of an instance where use of cationically active substances has assumed importance is in the cellophane industry. For a number of years increasing quantities of cationically active substances, primarily, as so-called, lubricants or anchoring agents have been employed in the production of cellulose hydrate films.

As the use of antiblocking agents could not be abandoned when cationically active substances were employed, the development of dispersions of SiO₂ which were stable in the presence of cationically active substances was a very pressing problem which to some extent has been solved in a prior proposal which is the subject matter of application Ser. No. 405,600, filed Oct. 21, 1964, now Patent Number 3,379,546. In accordance therewith the films are passed through a bath containing a softening agent, or a bath preceding such a bath, which contains an antiblocking agent in the form of an aqueous dispersion of oxide aerogels and, if desired, additions of lubricating or anchoring agents. Mixtures of finely divided oxide aerogels, especially of finely divided pyrogenic silica aerogel, with a particle size of less than 0.15μ with known anchoring agents, for example, high molecular weight organic compounds in hydrophilic form, and especially polyethylene imines or precondensates of urea, thiourea or melamine with formaldehyde are added to such baths as antiblocking agents. These mixed products are obtained by intense dispersion of the finely divided oxides, supplied in dry form, in an aqueous solution of the high molecular weight organic compound.

A mixed product of finely divided pyrogenic silica, such as, Aerosil or Cabosil, with a particle size of at most 0.15μ with polyethylene imine in an aqueous medium is particularly suited for the above indicated purpose, the silica content being between 8 and 20%, preferably, between 12 and 15%, by weight and the polyethylene imine content being 1.5 to 4%, preferably, 1.5–2.0%, by weight. The polyethylene imine product which hereinafter is designated as PEI is a well known product often used to increase the wet strength of paper is obtained by the catalytic acid (cationic) polymerization of ethylene imine.

Although the concentrations attainable, as indicated above, in general suffice, there has been great desire by those versed in this field to increase the solids content of the aqueous dispersions without requiring an increased PEI content. Even a further reduction of the PEI content is desired as such reduction, when the dispersion is used in the improvement of the surface characteristics of cellulose hydrate films, permits longer and more complete exhaustion of the softener containing baths and therefore renders the process more economical. While the dispersions produced according to Ser. No. 405,600 usually fulfill the requirements with the usual degree of exhaustion of the softener containing baths, when such softener containing baths are used over a more extended period of time, there is a tendency for free PEI which was not bound in the preparation of the silica dispersion because of the presence of a certain excess thereof, to accumulate in the softening bath which may cause blocking to occur again. In addition, the stability of the softening bath can be reduced in that at temperatures above 50° C. the free PEI may polymerize further and thereby unfavorably influence the process.

The object of the present invention is to provide a process for the production of stable aqueous dispersions of finely divided pyrogenic oxides suitable for the surface treatment of cellulose hydrate films which renders it possible to increase the oxide aerogel content while simultaneously requiring only small quantities of PEI.

According to the invention it was found that this object could be realized by the addition of acids, preferably, organic acids such as formic, acetic or lactic acid to the aqueous solution of PEI having a 1–3%, preferably, a 1–1.5%, by weight PEI content to adjust the pH thereof to 5–6, preferably, 5.2–5.5, before the admixture and dispersion of the dry oxide aerogel therein. The PEI in such acidified dispersions at least in part is in the form of an acid addition salt. In addition, it was found that the BET surface area of the oxide aerogel, preferably, a silica aerogel, which is dispersed is of importance. Oxide aerogels which have a BET surface area of 20–200 m.²/g., preferably, 40 to 100 m.²/g., and a particle size up to about 0.15μ have been found particularly suited.

According to the invention it is possible to attain stable aqueous dispersions containing 75 to 300, preferably, 180 to 240, parts by weight of oxide aerosol and 10 to 20, preferably, 10–15, parts by weight of PEI per 1000 parts by weight of the dispersion.

The stable dispersions produced according to the invention can either be used together with the lubricating or anchoring agents employed in the production of cellulose hydrate films or be added as usual to a bath preceding the softener bath.

In addition, the dispersions according to the invention can, because of their high oxide aerogel solids and their low PEI content, be employed without difficulty in the production of such cellulose hydrate films which are not processed with lubricating or anchoring agents.

The preparation and use of the dispersions according to the invention are illustrated by the following examples. In such examples the 50% aqueous PEI paste employed was the well known commercially available product Polymin-P in which the PEI was prepared by catalytic acid polymerization of ethylene imine which was terminated by neutralization just before complete water solubility was lost to provide an alkaline reaction.

EXAMPLE 1

2 kg. of an aqueous 50% PEI paste were dissolved in 76 liters of distilled water in a suitable stirring vessel. Thereafter 4.0 liters of 40% acetic acid were slowly added to such solution while stirring. Then 18 kg. of a finely divided pyrogenic silica aerogel with a BET surface area of 65 m.$^2$/g. were stirred into such solution and intensively dispersed therein with a high capacity stirrer.

The silica aerogels employed need not be pure but can contain up to 1% of foreign oxides such as $Al_2O_3$.

EXAMPLE 2

Analogously to Example 1, 1.5 kg. of a 50% aqueous PEI paste were dissolved in 72.5 liters of distilled water and 3.5 liters of 40% acetic acid added thereto. Then 22.5 kg. of pyrogenic silica containing 0.5% of $Al_2O_3$ (obtained by the decomposition of a mixture of silicon tetrachloride and aluminum chloride vapors in a flame formed by the combustion of hydrogen containing gases) which had a surface area of 35 m.$^2$/g. were also analogously stirred in and dispersed in such solution.

EXAMPLE 3

A film of regenerated cellulose produced in the usual manner was passed at 25° C. through an aqueous softener bath containing 4% by weight of glycerine, as softener, and 0.5 g. per liter of a urea formaldehyde percondensate, as an anchoring agent, to which, in addition, 3 ml. of the dispersion of Example 1 had been added per liter. The excess liquid was squeezed off from the surface of the film by passage between rubber rollers and such film then passed over drying rollers heated to 75–90° C. The resulting regenerated cellulose film possessed good surface characteristics and could be stored for some time in stacked or rolled up form prior to subsequent processing, such as, lacquering, without danger of sticking together (blocking).

EXAMPLE 4

A regenerated cellulose film was processed as in Example 3 with a softener bath of the same composition except that 1.5 ml. of the dispersion of Example 1 was added instead of the 3 ml. per liter of the dispersion of Example 1.

Again the treated regenerated cellulose film could be stored for longer periods of time without danger of blocking.

In the accompanying drawings:

FIGS. 1–3 show graphs indicating the viscosity patterns of various $SiO_2$ aerogel dispersions produced with PEI.

In the following first nine tests, dispersions with different PEI contents—in tests 1–3 with constant and in tests 4–9 with various $SiO_2$ aerogel concentrations—with regard to their viscosity behavior over longer periods of time were investigated. The BET surface area of the $SiO_2$ aerogel employed in all of the tests 1–9 was 60 m.$^2$/g. In tests 1–3 no acid was added whereas in tests 4–9 acid had been added. The results of such tests are tabulated in the following Tables 1 and 2.

TABLE 1

| Test No. | Dest. H$_2$O, g. | PEI as 50% paste, g. | SiO$_2$ aerogel, g. | Viscosity in ° E./20° C. after (days)— | | | | |
|---|---|---|---|---|---|---|---|---|
| | | | | 1 | 3 | 7 | 14 | 30 |
| 1 | 815 | 50 | 135 | 1.32 | 1.34 | 1.36 | 1.31 | 1.30 |
| 2 | 825 | 40 | 135 | 1.26 | 1.26 | 1.29 | 1.26 | 1.23 |
| 3 | 845 | 20 | 135 | 1.53 | Gel | | | |

TABLE 2

| Test No. | Dest. H$_2$O, g. | PEI as 50% paste, g. | 40% acetic acid, g. | SiO$_2$ aerogel, g. |
|---|---|---|---|---|
| 4 | 775 | 50 | 40 | 135 |
| 5 | 785 | 40 | 40 | 135 |
| 6 | 805 | 20 | 40 | 135 |
| 7 | 790 | 20 | 40 | 150 |
| 8 | 760 | 20 | 40 | 180 |
| 9 | 740 | 20 | 40 | 200 |

| Test No. | Viscosity in E.°/20° C. after (days)— | | | | |
|---|---|---|---|---|---|
| | 1 | 3 | 7 | 14 | 30 |
| 4 | 1.29 | 1.31 | 1.30 | 1.28 | 1.27 |
| 5 | 1.23 | 1.23 | 1.25 | 1.23 | 1.22 |
| 6 | 1.21 | 1.21 | 1.19 | 1.19 | 1.18 |
| 7 | 1.28 | 1.32 | 1.34 | 1.34 | 1.30 |
| 8 | 1.91 | 1.86 | 1.86 | 1.83 | 1.78 |
| 9 | 2.23 | 2.43 | 2.38 | 2.38 | 2.32 |

As can be seen from Table 1, in the absence of the addition of acid, usable dispersions containing 13.5% by weight of $SiO_2$ could not be obtained with less than 2% by weight of PEI as with low quantities the dispersions gel after a few days' standing.

As can be seen from Table 2 the addition of the acid not only renders it possible to obtain usable dispersions not only with high $SiO_2$ contents but also with lower quantities of PEI.

The viscosity patterns of the dispersions in test Nos. 2 and 6 over a period of 30 days is shown in FIG. 1. It can be seen therefrom that a smaller concentration of PEI salt (test 6) is required for the production of a stable dispersion than with PEI in the form of a base (test 2).

Tests 10–14 were carried out to show the influence of the pH on the stability of the dispersion. A $SiO_2$ aerogel with a BET surface area of 60 m.$^2$/g. was employed in all such tests. Each of such test dispersions also had 0.2 g. of sodium metaphosphate per kilo added thereto as stabilizer. The results of such tests are given below in Table 3.

TABLE 3

| Test No. | Dest. H$_2$O, g. | PEI as 50% paste, g. | Acetic acid 40%, g. | SiO$_2$ aerogel, g. | pH | Viscosity in ° E./20° C. after (days)— | | | | |
|---|---|---|---|---|---|---|---|---|---|---|
| | | | | | | 1 | 3 | 7 | 14 | 30 |
| 10 | 827 | 20 | 10 | 143 | 7.2 | 1.36 | 1.34 | 1.36 | 1.34 | 1.32 |
| 11 | 817 | 20 | 20 | 143 | 6.4 | 1.34 | 1.34 | 1.31 | 1.30 | 1.30 |
| 12 | 807 | 20 | 30 | 143 | 6.0 | 1.31 | 1.30 | 1.30 | 1.28 | 1.27 |
| 13 | 797 | 20 | 40 | 143 | 5.3 | 1.28 | 1.28 | 1.27 | 1.25 | 1.25 |
| 14 | 787 | 20 | 50 | 143 | 4.8 | 1.35 | 1.38 | 1.38 | 1.36 | 1.35 |

The viscosity patterns obtained in tests 10–14 are shown in FIG. 2.

It can be seen that a pH in the range of 5–6 provides the optimal viscosity pattern.

In addition, tests 15 and 16 were carried out to show the general effect of the BET surface area of the $SiO_2$ aerogel on the viscosity pattern of dispersions produced with PEI. In these tests no addition of acid was made. Analogous results are also obtained with acidified PEI (PEI salt). The results of the tests are given in the following Table 4.

TABLE 4

| Test No. | Dest. H₂O, g. | PEI as 50% paste, g. | SiO₂ BET, 200 m.²/g. | SiO₂ BET, 60 m.²/g. | Viscosity in ° E./20° C. after (days)— | | | | |
|---|---|---|---|---|---|---|---|---|---|
| | | | | | 1 | 3 | 7 | 14 | 30 |
| 15 | 845 | 80 | 75 | | 1.48 | 2.70 | 3.28 | Gel | -- |
| 16 | 845 | 80 | | 75 | 1.21 | 1.22 | 1.22 | 1.24 | 1.24 |

FIG. 3 shows the viscosity pattern of such tests over a period of 7 days.

It furthermore was found that still a greater reduction of the PEI concentration in the PEI-SiO₂ dispersions added to the softener baths can be attained by the addition of an inorganic acid such as HCl and especially $H_3PO_4$. When an inorganic acid such as $H_3PO_4$ or HCl is added to an aqueous solution of, for example, 1–2% by weight of PEI, it is possible to produce stable PEI-SiO₂ dispersions containing between 0.6 and 1.2% by weight of PEI and between 15 and 20% by weight of SiO₂.

This is indicated by the following tabulated tests recorded in Tables 5–7.

The viscosity patterns with constant PEI content and varying SiO₂ are given in the first of such tables.

TABLE 5

| Test No. | Dest. H₂O, ml. | PEI, percent | H₃PO₄, 85% ml. | SiO₂ aerogel BET, 60 m.²/g. | Viscosity in ° E./20° C. after (days)— | | |
|---|---|---|---|---|---|---|---|
| | | | | | 1 | 3 | 6 |
| 17 | 837.72 | 0.8 | 12 | 150 | 1.16 | 1.17 | 1.19 |
| 18 | 827.82 | 0.8 | 12 | 160 | 1.18 | 1.20 | 1.21 |
| 19 | 817.92 | 0.8 | 12 | 170 | 1.21 | 1.23 | 1.25 |
| 20 | 807.92 | 0.8 | 12 | 180 | 1.25 | 1.28 | 1.33 |

The following Table 6 gives the suited PEI concentration dependent upon the SiO₂ with reference to the viscosity patterns obtained.

TABLE 6

| Test No. | Dest. H₂O, ml. | PEI, percent | H₃PO₄, 85% ml. | SiO₂ aerogel BET, 60 m.²/g. | Viscosity in ° E./20° C. after (days)— | | |
|---|---|---|---|---|---|---|---|
| | | | | | 1 | 3 | 6 |
| 21 | 837.92 | 0.8 | 12 | 150 | 1.16 | 1.17 | 1.19 |
| 22 | 837.94 | 0.6 | 12 | 150 | 1.23 | 1.29 | 1.36 |
| 23 | 837.96 | 0.4 | 12 | 150 | 1.38 | Gel | |
| 24 | 837.98 | 0.2 | 12 | 150 | Gel | | |

Table 7 below indicates the substantial influence of the pH provided by the addition of inorganic acids. Various quantities of H₃PO₄ were added to an aqueous 0.8% PEI solution.

TABLE 7

| Test No. | 0.8% PEI sol., ml. | H₃PO₄, 85% ml. | pH | SiO₂ aerogel BET, 60 m.²/g. | Viscosity in ° E./20° C. after (days)— | | |
|---|---|---|---|---|---|---|---|
| | | | | | 1 | 3 | 6 |
| 25 | 845 | 5 | 7.2 | 150 | Gel | | |
| 26 | 844 | 6 | 6.8 | 150 | Gel | | |
| 27 | 842 | 8 | 6.2 | 150 | 1.28 | 1.34 | 1.38 |
| 28 | 840 | 10 | 5.8 | 150 | 1.24 | 1.26 | 1.27 |
| 29 | 839 | 11 | 5.4 | 150 | 1.19 | 1.20 | 1.21 |
| 30 | 838 | 12 | 5.0 | 150 | 1.16 | 1.17 | 1.19 |

It is also possible to employ silica aerogels with high BET surface areas (up to 200 m.²/g.) for the production of such dispersions.

I claim:
1. A stable aqueous dispersion of at least one finely divided pyrogenic silica aerogel adapted for the surface treatment of cellulose hydrate films, said dispersion consisting essentially of an acidic aqueous solution of 1–3% by weight of polyethylene imine, the pH of said solution being between about 5 and 6 so that at least a portion of said polyethylene imine is in the form of an acid addition salt thereof, and of about 7.5 to 30% by weight of said finely-divided pyrogenic silica aerogel dispersed in said solution.

2. A stable dispersion according to claim 1 in which said acidic aqueous dispersion contains 1 to 1.5% of polyethylene imine dissolved therein and 18–24% by weight of finely divided pyrogenic silica aerogel dispersed therein.

3. A stable dispersion according to claim 1, in which the solvent of said aqueous solution consists essentially of water and of at least one acid selected from the group consisting of formic, acetic, lactic, phosphoric and hydrochloric acids.

4. A stable dispersion according to claim 1 in which said pyrogenic silica aerogel has a surface area between about 20 and 200 m.²/g.

5. A stable dispersion according to claim 1 in which said pyrogenic silica aerogel has a surface area between about 40 and 100 m.²/g.

6. The stable dispersion of claim 1 in which said pyrogenic silica aerogel contains up to about 1 wt. percent of aluminum oxide.

7. A method of producing a stable aqueous dispersion of a pyrogenic silica aerogel having a particle size of less than 0.15μ which comprises adding an acid to an aqueous solution of polyethylene imine to adjust its pH to between about 5 and 6 and intensively dispersing the silica aerogel in said acidified solution, the proportions of said polyethylene imine and said silica aerogel being such that the dispersion contains 1 to 3% of the former and 7.5 to 30% of the latter.

References Cited

UNITED STATES PATENTS

| 2,951,044 | 8/1960 | Wagner et al. | 252—313 |
| 2,982,665 | 5/1961 | Wilcox | 252—313 X |
| 2,984,629 | 5/1961 | Loftman et al. | 252—313 |
| 3,313,736 | 4/1967 | Dickson et al. | 252—357 X |

FOREIGN PATENTS

| 680,973 | 2/1964 | Canada. |

RICHARD D. LOVERING, Primary Examiner

U.S. Cl. X.R.

106—193, 308; 252—313